(12) United States Patent
Sieber et al.

(10) Patent No.: US 6,506,466 B1
(45) Date of Patent: Jan. 14, 2003

(54) ADHESIVE VAPOR BARRIER TAPE FOR A RIDGE PURLIN

(75) Inventors: Marco Sieber, Horw (CH); Reto Sieber, Sigigen (CH)

(73) Assignee: SILU Verwaltung AG, Meggen (CH)

( * ) Notice: Subject to any disclaimer, the term of this patent is extended or adjusted under 35 U.S.C. 154(b) by 116 days.

(21) Appl. No.: 09/660,278

(22) Filed: Sep. 12, 2000

(30) Foreign Application Priority Data

Oct. 6, 1999 (DE) .......................................... 199 48 058

(51) Int. Cl.[7] ................................................. E04D 1/28
(52) U.S. Cl. ......................... 428/40.1; 52/417; 52/514; 52/746.1; 52/746.11; 428/41.7; 428/41.8; 428/194; 428/212; 428/213
(58) Field of Search ............................... 428/40.1, 194, 428/41.8, 41.7, 212, 213; 52/514, 417, 746.1, 746.11

(56) References Cited

U.S. PATENT DOCUMENTS

| | | | |
|---|---|---|---|
| 4,153,747 A | 5/1979 | Young et al. ............. | 428/40.1 |
| 5,593,771 A | 1/1997 | Lawless et al. .......... | 428/317.3 |
| 5,820,958 A * | 10/1998 | Swallow .................... | 428/42.2 |
| 5,881,521 A * | 3/1999 | Porter ........................ | 52/417 |
| 6,269,595 B1 * | 8/2001 | Blubaugh .................. | 52/105 |

FOREIGN PATENT DOCUMENTS

| | | |
|---|---|---|
| DE | 4430657 | 3/1996 |
| DE | 29723454 | 11/1996 |
| DE | 19606235 | 8/1997 |
| DE | 29619424 | 11/1997 |
| DE | 29717915 | 1/1998 |

* cited by examiner

Primary Examiner—Nasser Ahmad
(74) Attorney, Agent, or Firm—Jordan and Hamburg LLP

(57) ABSTRACT

The present invention relates to a single-sided adhesive vapor barrier tape 1 having a vapor barrier strip 2 which has a width BD between 40 cm and 100 cm and, on each of its two long edges 3, has a single-sided adhesive vapor barrier strip 4, each adhesive vapor barrier strip 4 being provided on its adhesive side with a protective means 7 which can be pulled off separately and prevents inadvertent adhesion of the adhesive strips 4. This adhesive vapor barrier tape is particularly suitable when producing a vapor-tight joint at a ridge purlin. In addition, the invention relates to a method of producing such a vapor-tight joint when finishing a roof at a ridge purlin.

14 Claims, 1 Drawing Sheet

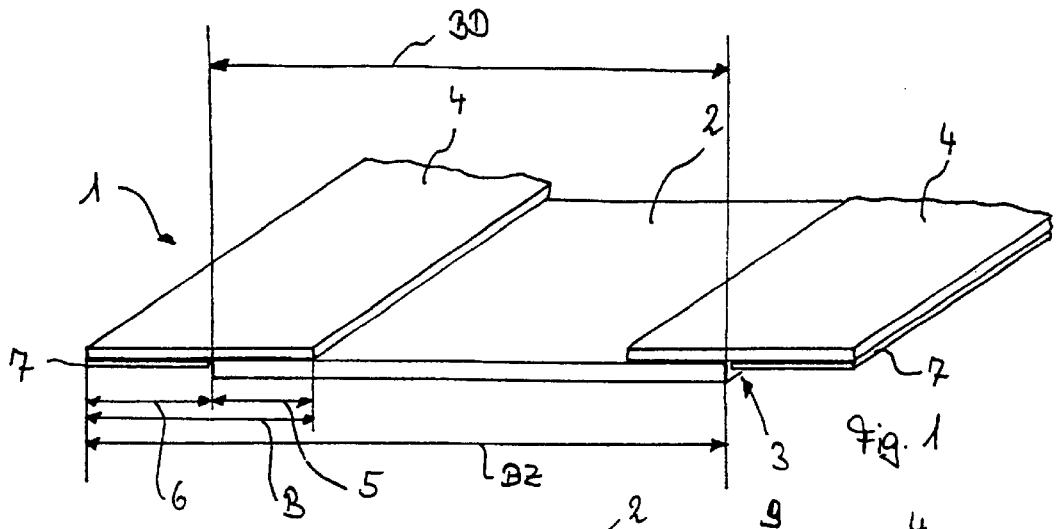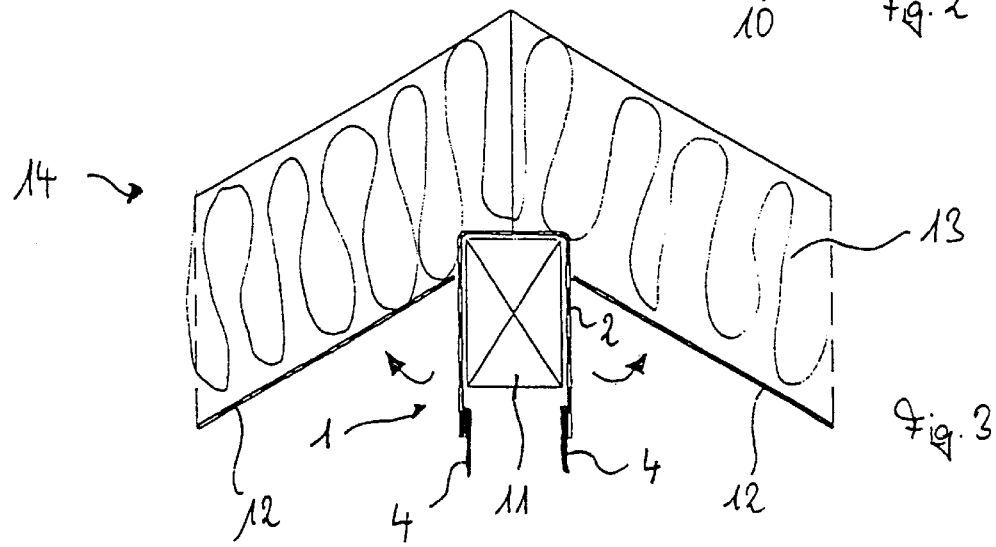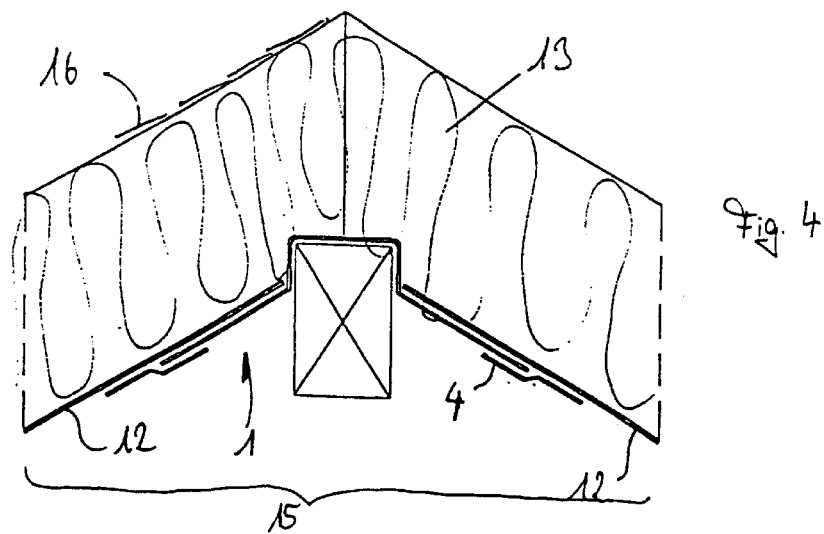

ADHESIVE VAPOR BARRIER TAPE FOR A RIDGE PURLIN

BACKGROUND OF THE INVENTION

The present invention relates to a single-sided adhesive vapour barrier tape which has a vapour barrier strip and adhesive strips.

A single-sided adhesive vapour barrier tape is disclosed, for example, by DE 297 23 454. This adhesive vapour barrier tape has an airtight substrate which is coated on one side with a plastic capable of diffusion and is provided on the other side with a contact adhesive. An adhesive vapour barrier tape of this type can be bonded over the entire width. Because of its construction, this adhesive tape is airtight. Such airtightness is required nowadays in roof construction. For this purpose, it is usual for vapour barriers to be incorporated in an airtight manner. For this purpose, airtight sheets or webs of paper or plastic are tacked beneath insulation, on the warm side, and are bonded so as to overlap and be airtight.

In roof construction, for reasons of the construction sequence, it is often not possible to achieve the absolute airtightness required by statute in an area of a top beam— also called a ridge purlin. For this reason, vapour barrier webs which run up obliquely in the roof on both sides from the masonry, in the direction of the gable, are connected at the sides to the ridge purlin in a complicated manner over the entire ridge length. For this purpose, a carpenter or roofer generally lays a film strip with a width of about 40 to 70 cm over the entire length of the ridge purlin. This is only possible at a time at which the unfinished roof storey has been set up, that is to say before the installation of any insulation and the entire roof construction, such as the roof tiles or facework.

The foil strip laid onto the ridge purlin is either cut out from vapour barrier material or else already supplied in a width of 40 to 70 cm. Placed on the ridge purlin, the foil strip then hangs down on both sides of the ridge purlin. In order to ensure the safety of the people working on the roof storey, the foil strip is generally non-slip on its side pointing upwards and is additionally firmly tacked to the ridge purlin using staples. As a result, the foil strip cannot be moved on the ridge purlin. The ridge purlin covered with the foil strip can therefore be walked on without risk of slipping even during the construction of the roof and the installation of insulation.

After the ridge purlin has been covered with the foil strip, the roof is insulated and the construction of the roof is provided with sarking felt and tiles. On the inside, a vapour barrier is then installed in an airtight manner as far as the ridge purlin, that is to say the gable. In the gable area, the hanging portions of the film strip fixed to the ridge purlin can then be folded up onto the adjacent vapour barrier and joined in an airtight manner using a corresponding single-sided or double-sided adhesive tape. Appropriate adhesive tapes which ensure airtightness are used for this purpose.

SUMMARY OF THE INVENTION

It is known for such a film strip, as a vapour barrier strip, with a length of 40 to about 70 cm to be provided with a double-sided adhesive tape in a left-hand and a right-hand portion and delivered in this way to a building site. A manual worker is then able to produce an airtight bond between the ridge-purlin strip resting on the ridge purlin and the flat vapour barrier fastened to the roof truss. This adhesive vapour barrier strip has the double-sided adhesive tapes, which are about 2 cm wide, at a distance from the edge of the film strip.

The object of the present invention is to provide an adhesive vapour barrier strip with a vapour barrier strip which permits reliable, airtight bonding, in particular in the roof gable area, when finishing a roof.

This object is achieved with a single-sided adhesive vapour barrier tape and with a method of producing a vapour-tight joint when finishing a roof at a ridge purlin.

A single-sided adhesive vapour barrier tape with a vapour barrier strip is constructed in such a way that the vapour barrier strip has a width between at least 35 cm and preferably 100 cm, and a single-sided adhesive vapour barrier strip is in each case arranged on both long edges of the vapour barrier strip. Each adhesive vapour barrier strip is provided on its adhesive side with a protective means which can be pulled off separately and prevents inadvertent adhesion of the adhesive strip. The adhesive vapour barrier strip preferably has a width of between 4 cm and 10 cm. On the one hand, this permits secure fastening and tightness between the vapour barrier strip and the adhesive vapour barrier strip itself. On the other hand, the result is that a sufficient width of the adhesive side remains to provide an airtight joint to an adjacent vapour barrier belonging to the ridge purlin. The single-sided adhesive vapour barrier strip is in particular applied in such a way that a part thereof, approximately 30 to 70%, preferably about half of its width, bonds to the vapour barrier strip or is welded to the latter. The portion appearing beyond this is covered on the adhesive side with a protective paper. For the purpose of airtight bonding, the protective paper needs to be pulled off only from the projecting adhesive side, this portion of the adhesive vapour barrier tape needs to be folded up and rubbed onto the vapour barrier. The joint produced in this way is airtight, and because of the adhesive side being present on only one side, the risk that creases or waves will be produced is minimized, which would lead to the joint between the adhesive vapour barrier tape and the flat vapour barrier of the roof not being airtight. An improvement to the achievable airtightness, in particular as viewed in terms of long-term effects, results if a film substrate, which bears the adhesive, is used for the adhesive vapour barrier strip. This film substrate is particularly smooth and, therefore, even in the event that creases occur, is able to close these in an airtight manner on the basis of a rubbing action.

It is preferable for the portion of the adhesive vapour barrier strip which is provided with a protective means and projects with respect to the vapour barrier strip to be 1.5 cm to 3 cm wide. Since, in roof finishing, wood is the constructional material normally used, but—considered over time—continues to "work", in particular on account of the large temperature differences between summer and winter, such a width of the adhesive vapour barrier strip makes it possible for there to be an adequate adhesive area in order to be able to compensate for distortion of the constructional materials used. Particular strength results if the adhesive vapour barrier strip is co-integrated into a layer construction of the vapour barrier strip. The vapour barrier strip is constructed of several layers, for example, so that the adhesive vapour barrier strip can be arranged between two of these layers. There is also the possibility of the adhesive vapour barrier strip forming one surface of the vapour barrier strip and, at the same time, terminating flush with the adjacent surface of this vapour barrier strip. This is obvious in particular when the adhesive vapour barrier strip is welded to the vapour barrier strip, since as a result the production of seams or incipient seams can be avoided.

A further configuration of the adhesive vapour barrier strip provides for the adhesive vapour barrier strip to be partially bonded onto the vapour barrier strip. The vapour barrier strip is preferably approximately 60 cm wide. This makes it possible, on the one hand, for various constructions of the connection between the ridge purlin and roof beam, to provide an adequate area of vapour barrier strip. On the other hand, such a length of the vapour barrier strip is sufficiently flexible, because of its width, to be able to compensate for extremely small movements of the beams without the airtightness of the vapour barriers being threatened. Such a wide vapour barrier strip preferably has on its long edges adhesive vapour barrier strips with an adhesive side which is to be bonded and is provided with a protective means that can be pulled off and which has a width which is equal to or greater than the width of the projecting adhesive strip.

The adhesive vapour barrier strip described above is used in particular during the production of a vapour-tight joint when finishing a roof at a ridge purlin. The vapour barrier strip is laid over the ridge purlin and, for the purpose of vapour-tight sealing, the respective protective means is then pulled off the adhesive vapour barrier strips, in order to bond the adhesive vapour barrier strips to an adjacent vapour barrier in a vapour-tight manner.

BRIEF DESCRIPTION OF THE DRAWINGS

Further advantageous refinements and features will be explained in the following drawing and its description. In the drawing:

FIG. 1 shows a first adhesive vapour barrier strip;

FIG. 2 shows a second adhesive vapour barrier strip;

FIG. 3 shows an adhesive vapour barrier strip according to FIG. 1, fixed to a ridge purlin; and FIG. 4 shows the first adhesive strip when it is bonded to vapour barriers.

DETAILED DESCRIPTION OF THE INVENTION

FIG. 1 shows a first adhesive vapour barrier strip 1. The first adhesive vapour barrier strip 1 has a vapour barrier strip 2 and, on each of its two long edges 3, a single-sided adhesive vapour barrier strip 4. The width B of the adhesive vapour barrier strip 4 is arranged such that the vapour barrier strip 2 is overlapped. This overlapping, first portion 5 is bonded or welded to the vapour barrier strip 2. A second portion 6, which projects beyond the vapour barrier strip 2, is provided with a protective means 7 which can be pulled off. The vapour barrier strip 2 is preferably constructed in layers, one surface being made non-slip. In addition, the vapour barrier strip 2 has, in particular, a strengthening layer, for example by means of reinforcement. The adhesive vapour barrier strip 4 is preferably constructed in such a way as revealed by DE 297 23 454 already mentioned above. With respect to the construction of the adhesive vapour barrier strip 4, reference is therefore made to this specification.

The width of an adhesive vapour barrier strip 4 and the width BD of the vapour barrier strip 2 are preferably coordinated with each other in such a way that the result is an intermediate width of the first adhesive vapour barrier strip 1 of about 70 cm.

FIG. 2 shows a second adhesive vapour barrier strip 8. The second adhesive vapour barrier strip 8 has the adhesive vapour barrier strips 4 co-integrated in a layer construction of the vapour barrier strip 2. The adhesive vapour barrier strip 4 preferably has a film substrate 9, to which an adhesive 10 is applied. The film substrate 9 is a material which can easily be joined to a material of the vapour barrier strip 2, for example by means of appropriate welding or bonding. The integration of the foil substrate 9 into the vapour barrier strip 2 has the advantage that a particularly tight joint is formed between the vapour barrier strip 2 and the adhesive vapour barrier strip 4, this joint being independent of the adhesive 10.

FIG. 3 shows the use of the first adhesive vapour barrier strip 1 on a ridge purlin 11. In each case a vapour barrier strip 12 is arranged on both sides of the ridge purlin 11. Above the vapour barrier 12 there is insulation 13 for this roof 14. The first adhesive vapour barrier strip 1 is placed over the ridge purlin 11 in such a way that the vapour barrier strip 2 extends along the length of the ridge purlin 11. The adhesive vapour barrier strips 4 hang down along the ridge purlin 11. In order to produce an airtight joint, the adhesive vapour barrier strips 4 are then bonded to the adjacent vapour barriers 12, as indicated by the arrows shown.

FIG. 4 shows the vapour-tight joint in the final state between the first adhesive vapour barrier strip 1 and the adjacent vapour barriers 12. Because of this seal 15, which is airtight overall, on the one hand there is adequate heat sealing provided by the insulation 13, on the other hand, in conjunction with the roof tiles 16 resting on the insulation 13, there is adequate protection against moisture. As can therefore be seen from FIGS. 3 and 4, the adhesive vapour barrier strip projecting beyond the long edges of the vapour barrier strip 2 prevents any part of the vapour barrier strip 2 projecting downwards from the vapour barriers 12, as would be the case with a double-sided adhesive vapour barrier strip applied to the vapour barrier strip 2. Instead, the arrangement of the single-sided adhesive vapour barrier strip 4 permits the production of a large, sealing area which prevents warm air creeping through to the outside.

What is claimed is:

1. Single-sided adhesive vapour barrier tape comprising:
   a flexible vapour barrier strip having a width of at least 35 cm;
   single-sided adhesive vapour barrier strips provided on at least two opposing edge portions of the flexible vapour barrier strip so that each of said single-sided adhesive vapour barrier strips overhangs the flexible vapour barrier strip to extend overhung portions from the flexible vapour barrier strip; and
   a protective means provided on a part of the adhesive side the overhung portions which can be pulled off separately from at least one single sided adhesive vapour barrier strip and prevents inadvertent adhesion of said overhung portions.

2. Single-sided adhesive vapour barrier tape according to claim 1, wherein at least one of the overhung portions has a width between 4 cm and 10 cm.

3. Single-sided adhesive vapour barrier tape according to claim 1 or 2, wherein the at least one single-sided adhesive vapour barrier strip of said single-sided adhesive vapour barrier strips includes a film substrate and an adhesive.

4. Single-sided adhesive vapour barrier tape according to claim 1 or 2, wherein the protective means covers the overhung portions and has a with a width of 1.5 to 3 cm.

5. Single-sided adhesive vapour barrier tape according to claim 1 or 2, wherein the at least one single sided adhesive vapour barrier strip of said single-sided adhesive vapour barrier strips is co-integrated into a layer structure of the flexible vapour barrier strip.

6. Single-sided adhesive vapour barrier tape according to claim 1 or 2, wherein the at least one single-sided adhesive vapour barrier strip of said single-sided adhesive vapour barrier strips is partially bonded to the flexible vapour barrier strip.

7. Single-sided adhesive vapour barrier tape according to claim 1 or 2, in which the flexible vapour barrier strip has a width of about 60 cm.

8. Method of producing a vapour-tight joint when finishing a roof at a ridge purlin comprising:
   providing an adhesive vapour tape having:
      a flexible vapour barrier strip having a width of at least 35 cm;
      single-sided adhesive vapour barrier strips provided on at least two opposing edge portions of the flexible vapour barrier strip so that each of said single-sided adhesive vapour barrier strips overhangs the flexible vapour barrier strip to extend overhung portions from the flexible vapour barrier strip; and
      a protective means provided on a part of the adhesive side of the overhung portions which can be pulled off separately from at least one single sided adhesive vapour barrier strip and prevents inadvertent adhesion of said at least one single-sided adhesive vapour barrier strip;
   placing the flexible vapour barrier strip over the ridge purlin;
   removing the protective means from the overhung portions;
   bonding the overhung portions to a second vapour barrier strip.

9. The method of producing a vapour-tight joint when finishing a roof at a ridge purlin according to claim 8, wherein at least one of the overhung portions has a width between 4 cm and 10 cm.

10. The method of producing a vapour-tight joint when finishing a roof at a ridge purlin according to claim 8 or 9, wherein the at least one single-sided adhesive vapour barrier strip of said single-sided adhesive vapour barrier strips includes a film substrate and an adhesive.

11. The method of producing a vapour-tight joint when finishing a roof at a ridge purlin according to claim 8 or 9, wherein the protective means covers the overhung portions and has a width of 1.5 to 3 cm.

12. The method of producing a vapour-tight joint when finishing a roof at a ridge purlin according to claim 8 or 9, wherein the at least one single sided adhesive vapour barrier strip of said single-sided adhesive vapour barrier strips is co-integrated into a layer structure of the flexible vapour barrier strip.

13. The method of producing a vapour-tight joint when finishing a roof at a ridge purlin according to claim 8 or 9, wherein the at least one single-sided adhesive vapour barrier strip of said single-sided adhesive vapour barrier strips is partially bonded to the flexible vapour barrier strip.

14. The method of producing a vapour-tight joint when finishing a roof at a ridge purlin according to claim 8 or 9, in which the flexible vapour barrier strip has a width of about 60 cm.

* * * * *